Feb. 4, 1930.  F. O. HULT  1,746,116
KNIFE
Filed Oct. 14, 1926
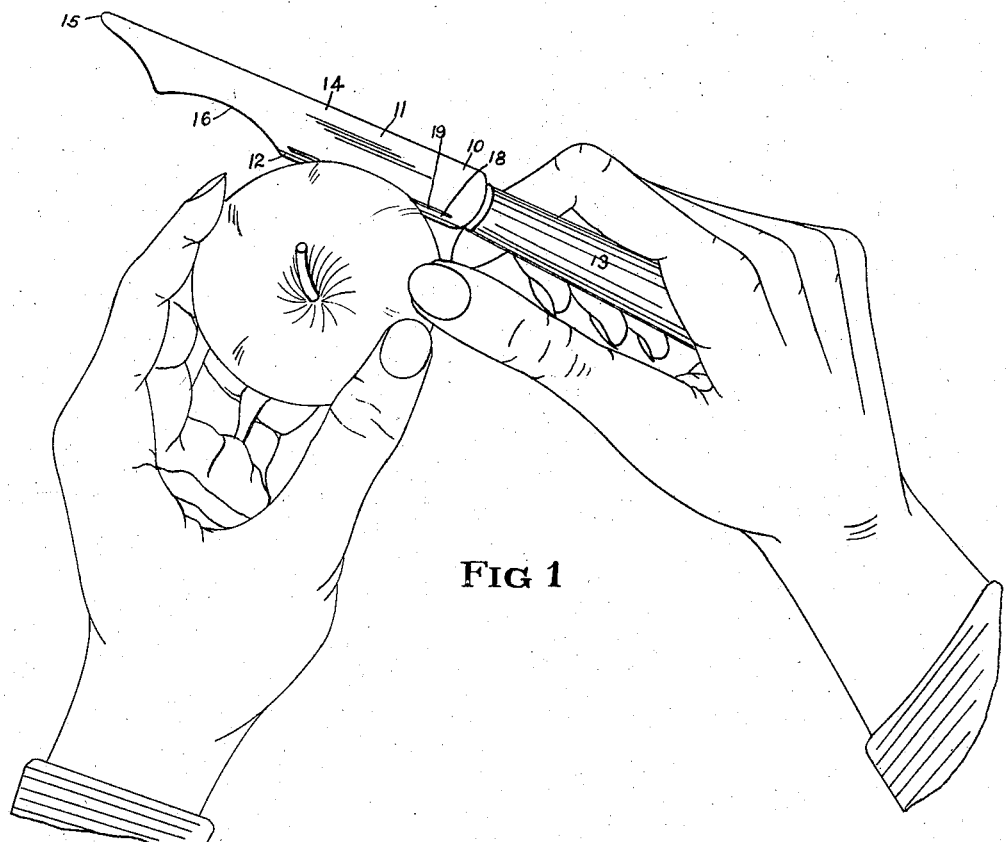
Fig 1
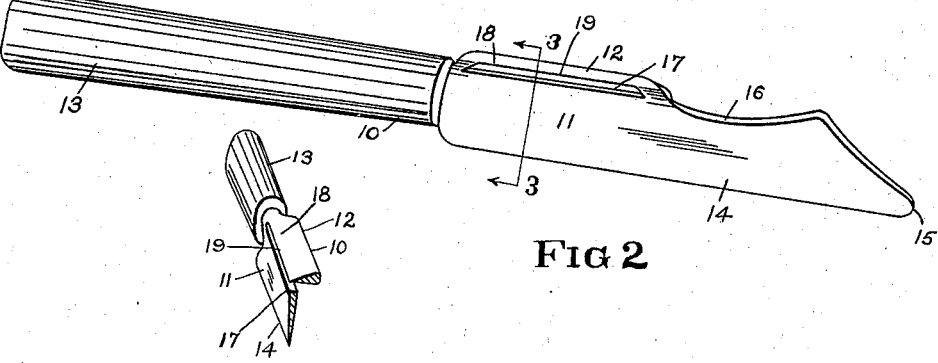
Fig 2
Fig 3
Inventor
FRANCIS O. HULT
By Clarence S. Walker.
His Attorney Patented Feb. 4, 1930

1,746,116

UNITED STATES PATENT OFFICE

FRANCIS O. HULT, OF JAMESTOWN, NEW YORK

KNIFE

Application filed October 14, 1926. Serial No. 141,519.

This invention relates to an improvement in a knife, and more particularly in a knife which is intended to be used in the kitchen for various purposes, including the paring of fruits, vegetables and similar articles.

The primary object of this invention is to provide a knife having a lower cutting edge of the usual type, a portion of the upper edge of which is slotted and bent backwardly to form a gauged supplementary cutting edge, by which fruit, vegetables, and so forth, can be pared.

A further object of this invention is to provide such a knife with a depression in the upper edge adjacent the paring blade, thus facilitating the use of the knife under certain conditions.

Other objects of this invention will appear from a consideration of the following description taken in connection with the drawings, which form a part thereof, and in which Fig. 1 is a perspective view showing the knife being used to pare an apple;

Fig. 2 is a perspective view of the knife alone; and

Fig. 3 is a perspective view of a portion of the knife taken in section and looking in the direction indicated by the arrows 3—3 in Figure 2.

In the drawings, the reference numeral 10 is employed to designate a knife embodying one form of this invention, comprising a blade 11 having an integral projection 12 along its upper edge, and a handle 13, which may be of any desired conformation. The blade 11 includes a lower or primary cutting edge 14, a pointed tip 15 and a recess or depression 16, formed adjacent the projection 12. The blade 11 is slotted at 17 at the base of the projection 12, which is bent back along the line of the slot 17 and forms a paring blade 18.

The blade 18 is here shown as bent back almost at right angles to the blade 11, but the particular angularity forms no part of the present invention. The edge 19 of the projection 12, which forms one side of the slot 17 is sharpened, as shown particularly in Figure 3, to provide a paring edge for the blade 18, parallel to the cutting edge 14. The edge 19 can be re-sharpened as desired to keep the blade 18 in proper condition for paring. The slot 17 not only permits sharpening of the edge 19, but also functions as a gauge to control the thickness of the peels removed by the edge 19.

The depression 16 in the upper edge of the blade particularly facilitates the use of the knife when paring potatoes or other irregular objects. With such a depression it is possible to pare portions of the object, adjacent to upstanding portions, the upstanding portions entering the depression and thus being out of contact with the blade 18.

While one embodiment only of this invention has been shown and described, applicant is not limited thereto, since it is obvious that other embodiments can be made without departing from the spirit and scope of this invention as set forth in the following claims.

Having thus set forth my invention what I claim as new and for which I desire protection by Letters Patent is:

1. A knife comprising a handle, a main blade secured to said handle, a cutting surface defining one edge of said main blade, a secondary blade adjacent the rear of and extending at right angles to said main blade, means supporting said secondary blade in spaced relation to said main blade, said blades and said means defining a longitudinal slot between the cutting edge of said secondary blade and the rear edge of said main blade whereby to facilitate the use of said secondary blade.

2. A knife comprising a handle, a main blade secured to said handle, a full length cutting surface defining one edge of said main blade, a secondary blade extending at right angles to said main blade, said secondary blade being adjacent the rear of said main blade and supported in spaced relation thereto, elements adjacent the ends of said secondary blade integrally joined to the rear edge of said main blade, said blades and said elements defining a longitudinally extending slot by which the rear edge of said main blade and the cutting edge of said secondary blade are spaced apart to facilitate the use of said secondary blade.

3. A knife comprising a handle, a main blade secured to said handle, a cutting surface defining one edge of said main blade, a secondary blade spaced from the rear of and extending at right angles to said main blade, means integrally joining the ends of said secondary blade to the rear edge of said main blade, said blades and said means defining a longitudinally extending slot between the cutting edge of said secondary blade and the rear edge of said main blade, the cutting edge of said secondary blade being substantially in line with the vertical center of said main blade whereby said secondary blade is prevented indiscriminate use.

In testimony whereof I have affixed my signature.

FRANCIS O. HULT.